United States Patent
Wang

(10) Patent No.: US 12,026,142 B2
(45) Date of Patent: Jul. 2, 2024

(54) METHOD FOR PROCESSING DATA, ELECTRONIC DEVICE, AND NON-TRANSITORY STORAGE MEDIUM

(71) Applicant: HON HAI PRECISION INDUSTRY CO., LTD., New Taipei (TW)

(72) Inventor: Po-Chung Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 62 days.

(21) Appl. No.: 17/526,298

(22) Filed: Nov. 15, 2021

(65) Prior Publication Data

US 2022/0207012 A1    Jun. 30, 2022

(30) Foreign Application Priority Data

Dec. 31, 2020    (CN) .......................... 202011632027.4

(51) Int. Cl.
G06F 16/215    (2019.01)
G06F 16/22    (2019.01)

(52) U.S. Cl.
CPC ........ *G06F 16/2264* (2019.01); *G06F 16/215* (2019.01)

(58) Field of Classification Search
CPC .. G06F 16/2264; G06F 16/215; G06F 16/906; G06F 18/213; G06F 18/214; G06F 18/241

See application file for complete search history.

(56) References Cited

U.S. PATENT DOCUMENTS

| 8,363,961 B1 * | 1/2013 | Avidan ..................... G06F 18/23 707/747 |
| 2020/0352520 A1 * | 11/2020 | Lei ........................... A61B 5/40 |
| 2021/0224857 A1 * | 7/2021 | Sinha ................. G06Q 30/0261 |

\* cited by examiner

*Primary Examiner* — Maher N Algibhah
(74) *Attorney, Agent, or Firm* — ScienBiziP, P.C.

(57) ABSTRACT

A method for processing data, applied in an electronic device, obtains dimensions of a target data set by dimensionality reduction processing, and creates a search index based on the target data set. A denominator d of a noise ratio is set. An unlabeled data point P is selected from the target data set, and neighbors of the data point P are searched for according to the search index to obtain a neighbor data set. A number of data in the neighbor data set of a type which is different from type of the data point P is calculated, the calculated number is set to be a numerator c of the noise ratio. The noise ratio A=c/d is calculated, and if greater than a preset noise ratio, the data point P is labeled as noise data. The present disclosure shortens the time of processing training data.

17 Claims, 4 Drawing Sheets

METHOD FOR PROCESSING DATA, ELECTRONIC DEVICE, AND NON-TRANSITORY STORAGE MEDIUM

FIELD

The present disclosure relates to a technical field of computing, specifically a method for processing data, an electronic device, and a non-transitory storage medium.

BACKGROUND

When using a classification algorithm, the most time consuming task is often in the training time, and the training time is related to a size of a data set and a design of the algorithm. In a classification data set, it is often necessary to repeatedly make adjustments for, and recalculate, tolerable noise to find a best classification plane for different label categories. Classification training is carried out in a data set with a large amount of noise, which leads to a significant increase in training time.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Optionally, the method for processing data of the present disclosure is applied to one or more electronic devices. The electronic device includes hardware such as, but not limited to, a microprocessor and an Application Specific Integrated Circuit (ASIC), Field-Programmable Gate Array (FPGA), Digital Signal Processor (DSP), embedded devices, etc.

The electronic device may be a device such as a desktop computer, a notebook, a palmtop computer, or a cloud server. The electronic device can interact with users through a keyboard, a mouse, a remote control, a touch panel, or a voice control device.

Figure 1:
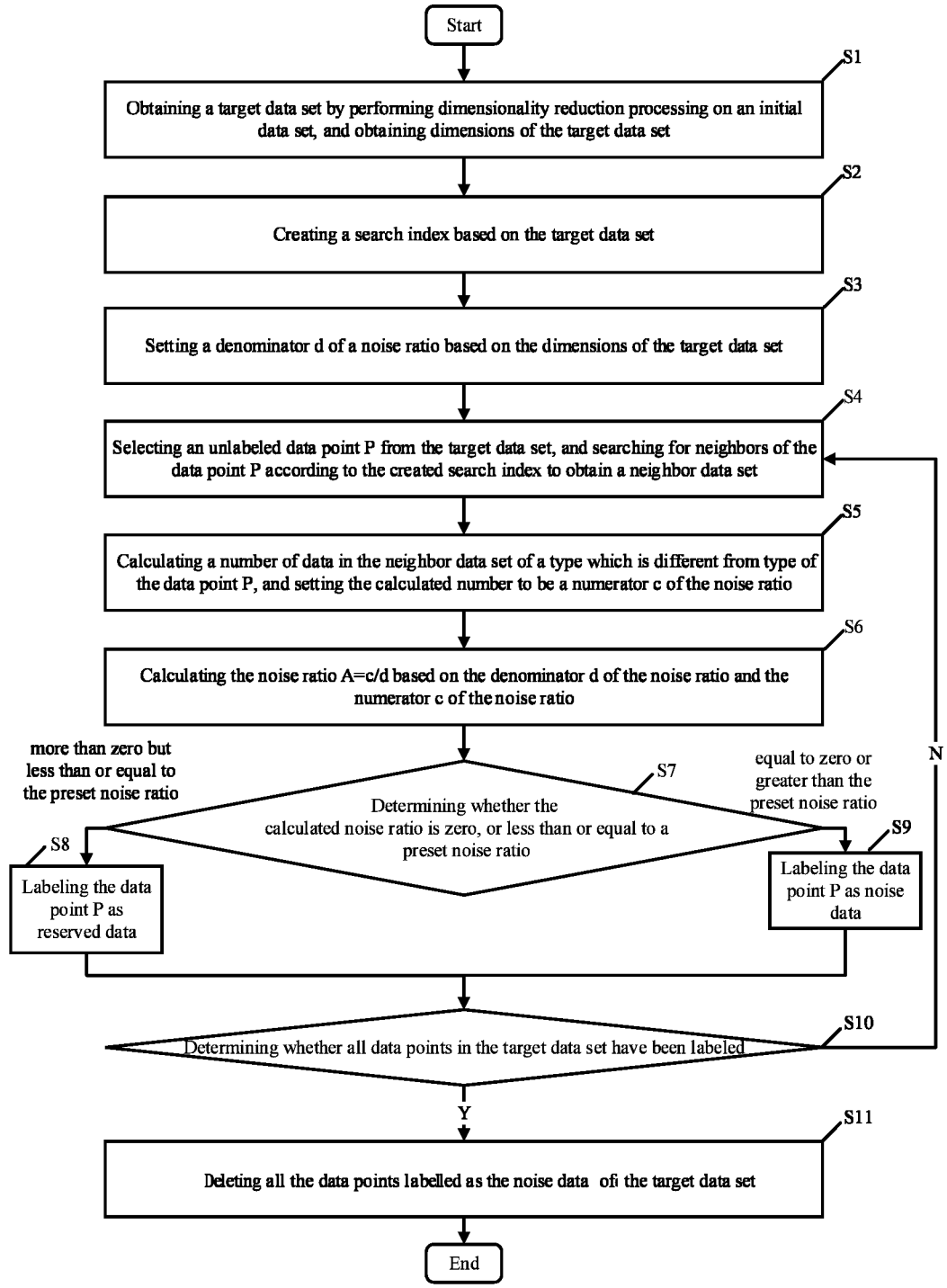
FIG. 1 shows a flowchart of a method for processing data provided in an embodiment of the present disclosure.

FIG. 1 is a flowchart of a method for processing data in an embodiment of the present disclosure. The method for processing data is applied to electronic devices. According to different needs, the order of steps in the flowchart can be changed, and some can be omitted.

In block S1, obtaining a target data set by performing dimensionality reduction processing on an initial data set, and obtaining dimensions of the target data set.

In an embodiment, in order to solve problems of extensive calculations and long training time caused by the large dimensionality of the initial data set, it is necessary to first perform dimensionality reduction processing on the initial data set. Specifically, the electronic device performing dimensionality reduction processing on the initial data set includes: selecting data of preset dimensions from the initial data set through a feature selection method, wherein the data of preset dimensions is data representing user information.

In an embodiment, in order to shorten the training time and avoid unnecessary calculations caused by the large amount of the initial data set, data of several dimensions with important attributes are selected from the initial data set through the feature selection method, thereby simplifying a model, reducing overfitting, and improving a generality of the model. For example, data recorded in the initial data set can be medical information of a patient, the medical information includes multi-dimensional information such as a height, a weight, an address, a phone number, a heart rate, and a body temperature. In order to analyze a physical condition of the patient, data with important attributes, such as the height, the weight, the heart rate, and the body temperature can be selected from all the medical information of the patient.

In an embodiment, the feature selection methods include a filter method, a wrapper method, and an embedded method. The filtering method is used to remove features of data which have small changes in value. The filtering method includes a variance selection method, a correlation coefficient scores method, a chi-squared test method, and a mutual information method. The wrapper method is used to determine whether to add features through an objective function. The wrapper method includes a recursive feature elimination algorithm. The embedded method is used to automatically select data by a trained learner.

In block S2, creating a search index based on the target data set.

In an embodiment, in order to speed up the search when searching for neighbors, a search index can be created for data in the target data set.

In an embodiment, a K-D tree algorithm and a ball tree (Ball tree) algorithm can be used to create the search index for the data in the target data set. Both the K-D tree algorithm and the ball tree (Ball tree) algorithm are existing technologies, and will not be repeated here.

In block S3, setting a denominator d of a noise ratio based on the dimensions of the target data set.

In an embodiment, the denominator d of the noise ratio is a number of neighbors to be selected. The denominator d of the noise ratio can be set to twice the dimension dim of the target data set, or can be set to $2^{\lceil \log_2^{dim} \rceil + 1}$.

In block S4, selecting an unlabeled data point P from the target data set, and searching for neighbors of the data point P according to the created search index to obtain a neighbor data set.

In an embodiment, the method for searching for neighbors of the data point P according to the created search index to obtain a neighbor data set includes:

(1) Taking the data point P as a center, searching for a first data point with a greatest similarity to the data point P from each dimension of the target data set to obtain a plurality of first data points.

In an embodiment, assuming that the target data set includes a first dimension, a second dimension, a third dimension, . . . , and a Nth dimension, each data point in the target data set also includes the first dimension, the second dimension, the third dimension, . . . , and the Nth dimension. The electronic device, from a first dimension of the target data set, searches for a plurality of first data points with a greatest similarity to the data point P. Specifically, from the first dimension of the target data set, the electronic device first searches for data points corresponding to data with a greatest similarity to first data of the first dimension of the data point P as the first data points. The electronic device searches for data with the greatest similarity to the first data both in a positive direction and in a negative direction of the first data. Secondly, from a second dimension of the target data set, the electronic device searches for data points corresponding to data with a greatest similarity to second data of the second dimension of the data point P as the first data points. The electronic device searches for data with the greatest similarity to the second data both in a positive direction and in a negative direction of the second data. All the dimensions of the target data set are searched for, until a plurality of first data points with the greatest similarity to the data point P are obtained.

For example, the target data set includes a data point P, a data point P1, a data point P2, . . . , and a data point PM. Assuming that dimensions of the target data set are 4, the data point P={P00, P01, P02, P03}, the data point P1={P10, P11, P12, P13}, the data point P2={P20, P21, P22, P23}, and the data point PM={Pm0, Pm1, Pm2, Pm3}. Thus, a first data of a first dimension of the data point P is P00, and data with a greatest similarity to the first data P00 is searched in a positive direction of the first data P00, for example, P20. Data with a greatest similarity to the first data P00 is searched in a negative direction of the first data P00, for example, P10. Therefore, the data point P1 corresponding to P20 and the data point P2 corresponding to P10 are used as the first data points.

From the second dimension of the target data set, the electronic device continues to search for the first data points corresponding to the data with the greatest similarity to the second data of the second dimension of the data point P. A second data of a second dimension of the data point P is P01. Data with a greatest similarity to the second data P01 is searched in a positive direction of the second data P01, for example, Pm1. Data with a greatest similarity to the second data P01 is searched in a negative direction of the second data P01, for example, P11. Therefore, the data point P1 corresponding to P11 and the data point PM corresponding to Pm1 are used as the first data points.

From the third dimension of the target data set, the electronic device continues to search for the first data points corresponding to the data with the greatest similarity to the third data of the third dimension of the data point P. A third data of the third dimension of the data point P is P02. Data with a greatest similarity to the third data P02 is searched in a positive direction of the third data P02, for example, Pm2. Data with a greatest similarity to the third data is searched in a negative direction of the third data P02, for example, P12. Therefore, the data point P1 corresponding to P12 and the data point PM corresponding to Pm2 are used as the first data points. The electronic device searches, from the first dimension of the target data set, for the data points corresponding to the data with the greatest similarity to the first data of the first dimension of the data point P, as the first data points, and repeats the search in relation to the second dimension of the target data set, finding the data points corresponding to the data with the greatest similarity to the second data of the second dimension of the data point P, as the first data points. When all the dimensions of the target data set have been searched for, a plurality of first data points with the greatest similarity to the data point P are obtained.

In an embodiment, a Euclidean distance between the data point P and the first data point can be calculated to determine whether the first data point is a point with the greatest similarity to the data point P. The smaller the Euclidean distance between the data point P and the first data point, the greater is the similarity between the first data point and the data point P. The greater the Euclidean distance between the data point P and the first data point, the less is the similarity between the first data point and the data point P.

It should be noted that, in addition to the Euclidean distance, the conditions or characteristics which are used to determine such similarity may also be a Hamming distance and a cosine similarity, not being limited.

(2) Using the plurality of first data points as neighbors of the data point P.

(3) Determining whether a number of the neighbors of the data point P satisfies the denominator d of the noise ratio.

(4) When the number of the neighbors of the data point P satisfies the denominator d of the noise ratio, determining the plurality of first data points as being the neighbor data set.

(5) When the number of the neighbors of the data point P does not satisfy the denominator d of the noise ratio, searching for a plurality of second data points with a second greatest similarity to the data point P from other dimensions of the target data set is continued, until the number of the neighbors of the data point P satisfies the denominator d of the noise ratio. It should be noted that, when the number of the neighbors in the neighbor data set composed of the plurality of first data points and the plurality of second data points still does not satisfy the denominator d of the noise ratio, the electronic device continues to search for, a plurality of third data points with a third greatest similarity to the data point P, from other dimensions of the target data set. And so on, until the number of the neighbors of the data point P satisfies the denominator d of the noise ratio.

In an embodiment, when the number of data points satisfying the denominator d of the noise ratio cannot be found from the data of current dimensions of the data point P, the neighbors of the data point P can continue to be searched from the data of other dimensions.

(6) Setting the plurality of first data points and the plurality of second data points as the neighbor data sets.

Figure 2:
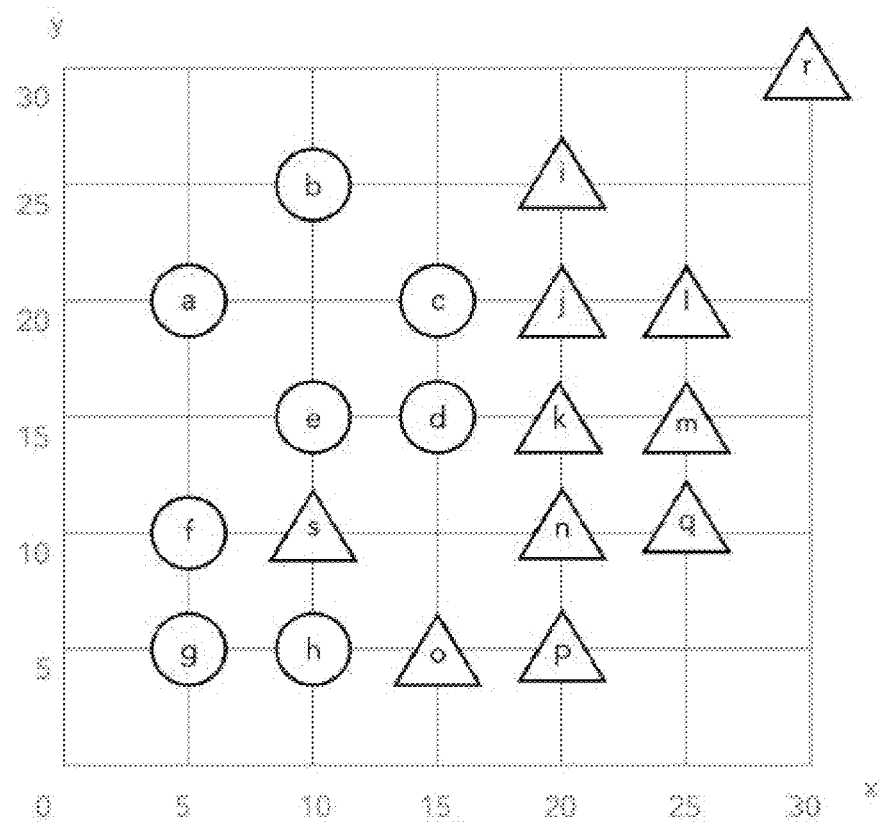
FIG. 2 shows a schematic diagram of a data set provided in an embodiment of the present disclosure.

For example, as shown in FIG. 2, a dimension of categories of the data in the target data set is 2. The target data set includes a data point a, a data point b, a data point c, a data point d, a data point e, a data point f, a data point g, and a data point h, which are represented by circles in FIG. 2. The target data set also includes a data point i, a data point j, a data point k, a data point 1, a data point m, a data point n, a data point o, a data point p, a data point q, and a data point r, which are represented by triangles in FIG. 2. A Euclidean distance between the data points can be calculated as a basis for determining the similarity between the data points. The noise ratio a can be set to 0.75 and the number of neighbors d can be set to 2.

First, the electronic device selects an unlabeled data point a, and searches for neighbors from a x-axis and a y-axis relative to the data point a. The electronic device starts searching in a positive direction relative to the x-axis of the data point a. When the data point d is searched, because there is no closest neighbor in this direction, the data point d is the closest neighbor currently found here. A Euclidean distance between the data point a and the data point d can be calculated as 11.2, As shown in Table 1.

TABLE 1

| relative to data point a | >=$a_x$ | <$a_x$ | >=$a_y$ | <$a_y$ |
|---|---|---|---|---|
| neighbors data points | d | | | |
| Euclideans | 11.2 | | | |

The electronic device continues to search for neighbors from the target data set. When a data point b is searched, a Euclidean distance between the data point a and the data point b is calculated to be 7.07. Because the closest neighbor in this direction is the data point d, the electronic device confirms that the data point b is closer to the data point a after comparing Euclidean distances between data points a and b, and between data points a and d. Therefore, the data point d in Table 1 is replaced with the data point b to obtain Table 2.

TABLE 2

| relative to data point a | >=ax | <ax | >=ay | <ay |
|---|---|---|---|---|
| neighbors data points | b | | | |
| Euclideans | 7.07 | | | |

The electronic device continues to search for neighbors from the target data set. Since no neighbors are found in a negative direction of the X axis of the data point a, the electronic device searches for the data point c in a positive direction of the Y axis, and searches for the data point e in the negative direction of the Y axis, as shown in Table 3.

TABLE 3

| relative to data point a | >=ax | <ax | >=ay | <ay |
|---|---|---|---|---|
| neighbors data points | b | null | c | e |
| Euclideans | 7.07 | | 5 | 7.07 |

Since no neighbors are found in the negative direction of the X axis of the data point a, and the number of neighbors of the data point a is less than 4, the electronic device searches for the data point f that is located in the negative direction of the X axis of the data point a and is closest to the data point a as the neighbor of the data point a, as shown in Table 4. The neighbor data set of the data point a includes the data point b, the data point f, the data point c, and the data point e as shown in Table 4.

TABLE 4

| relative to data point a | >=ax | <ax | >=ay | <ay |
|---|---|---|---|---|
| neighbors data points | b | f | c | e |
| Euclideans | 7.07 | 10 | 5 | 7.07 |

The electronic device then selects the unlabeled data point d, searches for neighbors on a x-axis and a y-axis relative to the data point d, and obtains the neighbor data set including the data point e, the data point k, the data point c, and the data point n, as shown in Table 5.

TABLE 5

| relative to data point d | >=dx | <dx | >=dy | <dy |
|---|---|---|---|---|
| neighbors data points | k | e | c | n |
| Euclideans | 5 | 5 | 5 | 7.07 |

The electronic device then selects the unlabeled data point r, searches for neighbors on a x-axis and a y-axis relative to the data point r, and obtains the first data points with similarity to the data point r, including the data point i and the data point 1, as shown in Table 6. Since no neighbors are found in the negative direction of the X axis and the positive direction of the Y axis of the data point r, the number of neighbors obtained is less than 4. It is necessary to continue to search for data points that are of a different category from the data point r from the target data set.

TABLE 6

| relative to data point r | >=rx | <rx | >=ry | <ray |
|---|---|---|---|---|
| neighbors data points | i | null | null | 1 |
| Euclideans | 14.1 | | 5 | 11.2 |

In a negative direction of a X axis and a positive direction of a Y axis relative to the data point r, the data points that have the same category as the data point r but which are the second closest in similarity to the data point r are respectively searched for, and respectively the data point i and the data point m, as Table 7 shows.

TABLE 7

| relative to data point r | >=rx | <rx | >=ry | <ry |
|---|---|---|---|---|
| neighbors data points | i | i | m | 1 |
| Euclideans | 14.1 | 11.2 | 15.8 | 11.2 |

The electronic device then selects the unlabeled data point s, searches for neighbors on a x-axis and a y-axis relative to the data point s, and obtains the neighbor data set including the data point g, the data point f, the data point e and the data point h, as shown in Table 8.

TABLE 8

| relative to data point s | >=sx | <sx | >=sy | <sy |
|---|---|---|---|---|
| neighbors data points | g | f | e | h |
| Euclideans | 7.07 | 5 | 5 | 5 |

In block S5, calculating a number of data in the neighbor data set of a type which is different from type of the data point P, and setting the calculated number to be a numerator c of the noise ratio.

For example, as shown in Table 4, a number of data whose type in a neighbor data set corresponding to the data point a is different from a type of the data point a is calculated as 0. As shown in Table 5, a number of data whose type in a neighbor data set corresponding to the data point d is different from a type of the data point d is calculated as 2, such as the data point k and the data point n. As shown in Table 7, a number of data whose type in a neighbor data set corresponding to the data point r is different from a type of the data point r is calculated as 0. As shown in Table 8, a number of data whose type in a neighbor data set corresponding to the data point s is different from a type of the data point s is calculated as 4, such as the data point g, the data point f, the data point e, and the data point h.

In block S6, calculating the noise ratio A=c/d based on the denominator d of the noise ratio and the numerator c of the noise ratio.

For example, a noise ratio corresponding to the data point a is calculated as 0; a noise ratio corresponding to the data point d is calculated as 0.5; a noise ratio corresponding to the data point r is calculated as 0; and a noise ratio corresponding to the data point s is calculated as 1.

In block S7, determining whether the calculated noise ratio is zero, or less than or equal to a preset noise ratio. When the calculated noise ratio is more than zero but less than or equal to the preset noise ratio, the flowchart goes to block S8. When the calculated noise ratio is equal to zero or greater than the preset noise ratio, the flowchart goes to block S9.

For example, the preset noise ratio can be set to 0.75.

In block S8, labeling the data point P as reserved data, and then the flowchart goes to block S10.

For example, the data point d is labeled as the reserved data.

In block S9, labeling the data point P as noise data, and then the flowchart goes to block S10.

For example, the data point a, the data point r, and the data point s are labeled as the noise data.

In block S10: determining whether all data points in the target data set have been labeled. When there are still data points in the target data set that are not labeled, the flowchart returns to block S4. When all data points in the target data set are labeled, the flowchart goes to block S11.

In block S11, deleting all the data points labelled as the noise data of the target data set.

Figure 3:
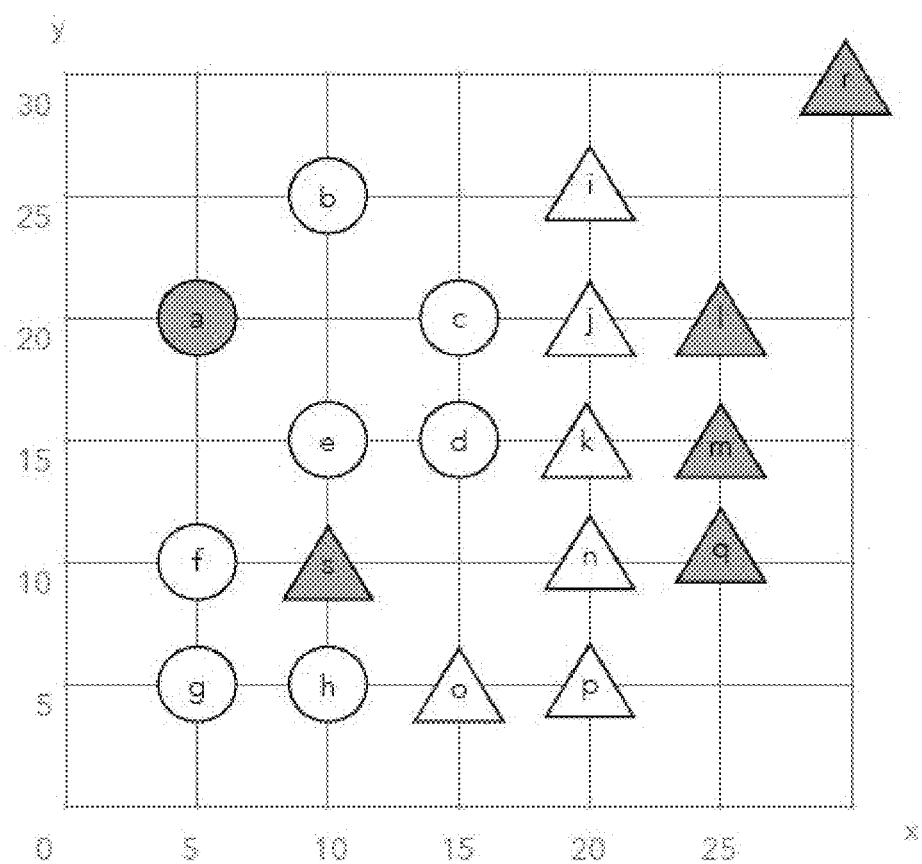
FIG. 3 is a schematic diagram of data points to be deleted in a data set provided in an embodiment of the present disclosure.

After using the method for processing data of the present disclosure to traverse all the data points in the target data set, the data points labeled as the noise data can be obtained, such as a labeled data point a, a labeled data point r, a labeled data point s, a labeled data point 1, a labeled data point m, and a labeled data point q, data points, labeled in gray, are shown in FIG. 3.

FIG. 1 describes the method for processing data in detail, by which a data processing speed can be improved. Functional modules and hardware device architecture that implement a device for processing data will be introduced below in conjunction with FIG. 4 and FIG. 5. It should be understood that the embodiments are only for illustrative purposes, and are not limited by this structure in the scope of the disclosure.

Figure 4:
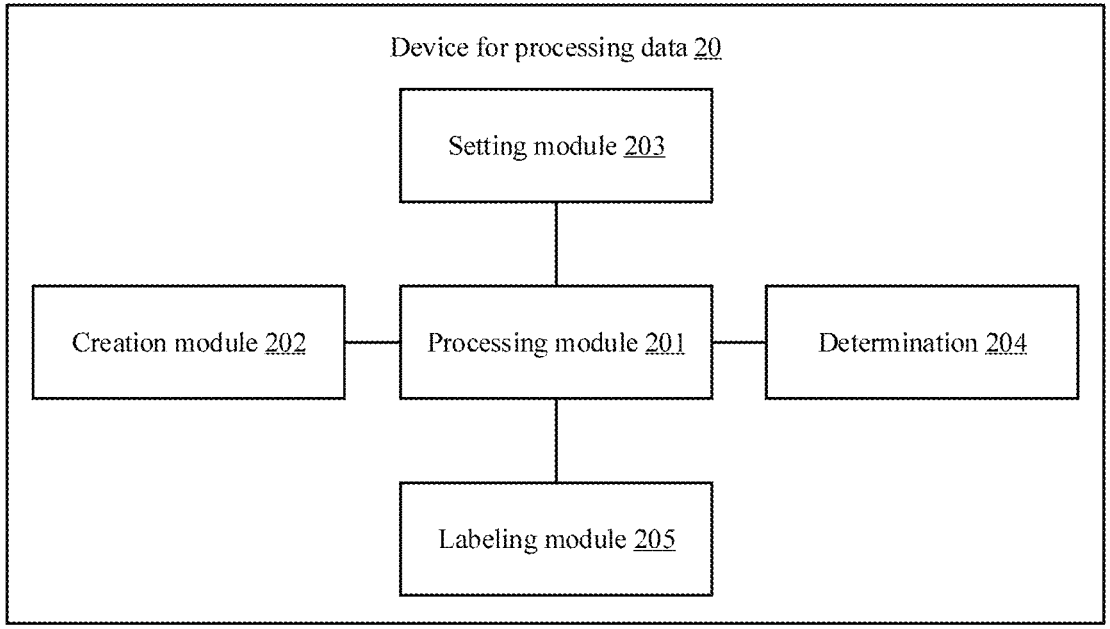
FIG. 4 shows a schematic structural diagram of a device for processing data provided in an embodiment of the present disclosure.

FIG. 4 shows a schematic structural diagram of a device for processing data provided in the embodiment of the present disclosure.

In some embodiments, the device for processing data 20 runs in an electronic device. The device for processing data 20 can include a plurality of function modules consisting of program code segments. The program code of each of the program code segments in the device for processing data 20 can be stored in a memory and executed by at least one processor to perform data processing (described in detail in FIG. 4).

As shown in FIG. 4, the device for processing data 20 can include: a processing module 201, a creation module 202, a setting module 203, a determination module 204, and a labeling module 205. A module as referred to in the present disclosure refers to a series of computer-readable instruction segments that can be executed by at least one processor and that are capable of performing fixed functions, which are stored in a storage medium. In some embodiment, the functions of each module will be detailed.

The processing module 201 obtains a target data set by performing dimensionality reduction processing on an initial data set, and obtains dimensions of the target data set. The creation module 202 creates a search index based on the target data set. The setting module 203 sets a denominator d of a noise ratio based on the dimensions of the target data set. The processing module 201 selects an unlabeled data point P from the target data set, and searches for neighbors of the data point P according to the created search index to obtain a neighbor data set. The setting module 203 calculates a number of data in the neighbor data set of a type which is different from type of the data point P, and sets the calculated number to be a numerator c of the noise ratio. The processing module 201 calculates the noise ratio A=c/d based on the denominator d of the noise ratio and the numerator c of the noise ratio. The determination module 204 determines whether the calculated noise ratio is less than or equal to a preset noise ratio. The labeling module 205 labels the data point P as noise data, when the calculated noise ratio is greater than the preset noise ratio.

The above-mentioned integrated unit implemented in a form of software functional modules can be stored in a non-transitory readable storage medium. The above software function modules are stored in a storage medium and includes several instructions for causing an electronic device (which can be a personal computer, a dual-screen device, or a network device) or a processor to execute the method described in various embodiments in the present disclosure.

The embodiment also provides a non-transitory readable storage medium having computer-readable instructions stored therein. The computer-readable instructions are executed by a processor to implement the blocks in the above-mentioned method for processing data, such as in blocks in blocks S1-S11 shown in FIG. 1.

The computer-readable instructions are executed by the processor to realize the functions of each module/unit in the above-mentioned device embodiments, such as the modules 201-205 in FIG. 4.

Figure 5:
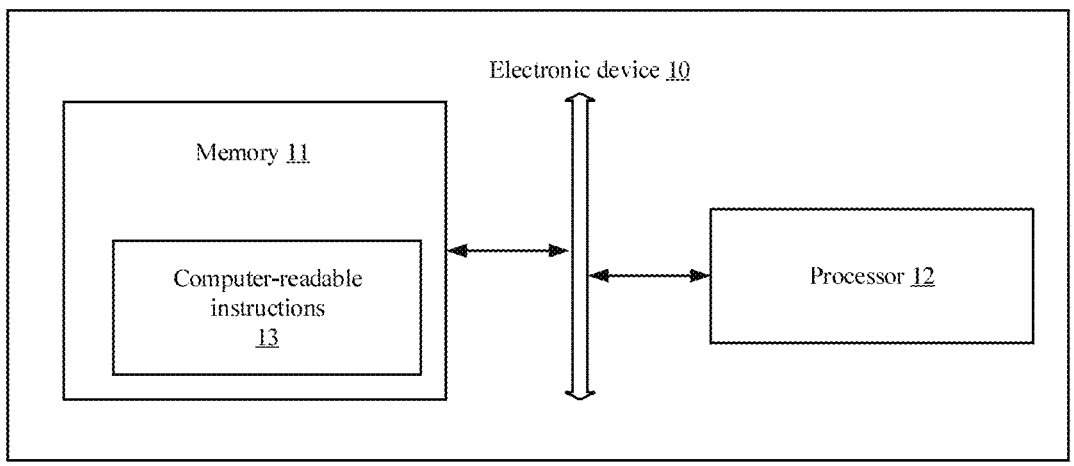
FIG. 5 shows a schematic structural diagram of an electronic device provided in an embodiment of the present disclosure.

FIG. 5 is a schematic structural diagram of an electronic device provided in an embodiment of the present disclosure. The electronic device 10 may include: a memory 11, at least one processor 12, and computer-readable instructions 13 stored in the memory 11 and executable on the at least one processor 12, for example, data processing programs. The processor 12 executes the computer-readable instructions 13 to implement the blocks in the embodiment of the method for processing data, such as in blocks in block S1-S11 shown in FIG. 1. Alternatively, the processor 12 executes the computer-readable instructions 13 to implement the functions of the modules/units in the foregoing device embodiments, such as the modules 201-205 in FIG. 4.

For example, the computer-readable instructions 13 can be divided into one or more modules/units, and the one or more modules/units are stored in the memory 11 and executed by the at least one processor 12. The one or more modules/units can be a series of computer-readable instruction segments capable of performing specific functions, and the instruction segments are used to describe execution processes of the computer-readable instructions 13 in the electronic device 10. For example, the computer-readable instruction can be divided into the processing module 201, the creation module 202, the setting module 203, the determination module 204, and the labeling module 205 as in FIG. 4.

The electronic device 10 can be an electronic device such as a desktop computer, a notebook, a palmtop computer, or a cloud server. Those skilled in the art will understand that the schematic diagram 5 is only an example of the electronic device 10 and does not constitute a limitation on the electronic device 10. Another electronic device 10 may include more or fewer components than shown in the figures or may combine some components or have different components. For example, the electronic device 10 may further include an input/output device, a network access device, a bus, and the like.

The at least one processor 12 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 12 can be a microprocessor or any conventional processor. The processor 12 is a control center of the electronic device 10 and connects various parts of the entire electronic device 10 by using various interfaces and lines.

The memory 11 can be configured to store the computer-readable instructions 13 and/or modules/units. The processor 12 may run or execute the computer-readable instructions 13 and/or modules/units stored in the memory 11 and may call up data stored in the memory 11 to implement various functions of the electronic device 10. The memory 11 mainly includes a storage program area and a storage data area. The storage program area may store an operating system, and an application program required for at least one function (such as a sound playback function, an image playback function, etc.), etc. The storage data area may store data (such as audio data, phone book data, etc.) created during the use of the electronic device 10. In addition, the memory 11 may include random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

When the modules/units integrated into the electronic device 10 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions 13. The computer-readable instructions 13 can be stored in a non-transitory readable storage medium. The computer-readable instructions 13, when executed by the processor, may implement the in blocks of the foregoing method embodiments. The computer-readable instructions 13 include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

In the several embodiments provided in the preset application, the disclosed electronic device and method can be implemented in other ways. For example, the embodiments of the devices described above are merely illustrative. For example, divisions of the units are only logical function divisions, and there can be other manners of division in actual implementation.

In addition, each functional unit in each embodiment of the present disclosure can be integrated into one processing unit, or can be physically present separately in each unit, or two or more units can be integrated into one unit. The above modules can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" may be used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method for processing data, the method comprising:
obtaining a target data set by performing dimensionality reduction processing on an initial data set, and obtaining dimensions of the target data set;
creating a search index based on the target data set;
setting a denominator d of a noise ratio based on dimensions of the target data set;
selecting an unlabeled data point P from the target data set, and searching for neighbors of the data point P according to the created search index to obtain a neighbor data set;
calculating a number of data in the neighbor data set of a type which is different from type of the data point P, and setting the calculated number to be a numerator c of the noise ratio;
calculating the noise ratio $A=c/d$ based on the denominator d of the noise ratio and the numerator c of the noise ratio;
determining whether the calculated noise ratio is less than or equal to a preset noise ratio;
when the calculated noise ratio is greater than the preset noise ratio, labeling the data point P as noise data;
determining whether all data points in the target data set have been labeled; and when all data points in the target data set are labeled, deleting all the data points labelled as the noise data of the target data set.

2. The method for processing data according to claim 1, further comprising:
when the calculated noise ratio is less than or equal to the preset noise ratio, labeling the data point P as reserved data.

3. The method for processing data according to claim 1, wherein searching for neighbors of the data point P according to the created search index to obtain a neighbor data set comprises:
taking the data point P as a center, searching for a first data point with a greatest similarity to the data point P from each dimension of the target data set to obtain a plurality of first data points;
using the plurality of first data points as neighbors of the data point P;
determining whether a number of the neighbors of the data point P satisfies the denominator d of the noise ratio;
when the number of the neighbors of the data point P satisfies the denominator d of the noise ratio, determining the plurality of first data points as being the neighbor data set.

4. The method for processing data according to claim 3, wherein searching for neighbors of the data point P according to the created search index to obtain a neighbor data set further comprises:
when the number of the neighbors of the data point P does not satisfy the denominator d of the noise ratio, continuing to search for a plurality of second data points with a second greatest similarity to the data point P from other dimensions of the target data set as the neighbors, until the number of the neighbors of the data point P satisfies the denominator d of the noise ratio.

5. The method for processing data according to claim 3, wherein the denominator d of the noise ratio being set to twice the dimension of the data set or being set to $2^{[log_2^{dim}]+1}$, dim represents the dimension of the data set.

6. The method for processing data according to claim 3, wherein taking the data point P as a center, searching for a first data point with a greatest similarity to the data point P from each dimension of the target data set comprises:
from a first dimension of the target data set, searching for data points corresponding to data with a greatest similarity to first data of the first dimension of the data point P as the first data points, comprising: searching for data points corresponding to data with a greatest similarity to the first data both in a positive direction and in a negative direction of the first data;
from a second dimension of the target data set, searching for data points corresponding to data with a greatest similarity to second data of the second dimension of the data point P as the first data points, comprising: searching for data points corresponding to data with a greatest similarity to the second data both in a positive direction and in a negative direction of the second data;
repeatedly, from the first dimension of the target data set, searching for the data points corresponding to the data with the greatest similarity to the first data of the first dimension of the data point P, as the first data points, and continuing searching for, from the second dimension of the target data set, the data points corresponding to the data with the greatest similarity to the second data of the second dimension of the data point P, as the first data points, when all the dimensions of the target data set have been searched for, a plurality of first data points with the greatest similarity to the data point P are obtained.

7. An electronic device comprising a memory and a processor, the memory stores at least one computer-readable instruction, which when executed by the processor causes the processor to:
obtain a target data set by performing dimensionality reduction processing on an initial data set, and obtain dimensions of the target data set;
create a search index based on the target data set;
set a denominator d of a noise ratio based on dimensions of the target data set;
select an unlabeled data point P from the target data set, and searching for neighbors of the data point P according to the created search index to obtain a neighbor data set;
calculate a number of data in the neighbor data set of a type which is different from type of the data point P, and set the calculated number to be a numerator c of the noise ratio;
calculate the noise ratio A=c/d based on the denominator d of the noise ratio and the numerator c of the noise ratio;
determine whether the calculated noise ratio is less than or equal to a preset noise ratio;
when the calculated noise ratio is greater than the preset noise ratio, label the data point P as noise data;
determining whether all data points in the target data set have been labeled;
when all data points in the target data set are labeled, deleting all the data points labelled as the noise data of the target data set.

8. The electronic device according to claim 7, wherein the processor further to:
when the calculated noise ratio is less than or equal to the preset noise ratio, label the data point P as reserved data.

9. The electronic device according to claim 7, wherein the processor search for neighbors of the data point P according to the created search index to obtain a neighbor data set comprises:
take the data point P as a center, search for a first data point with a greatest similarity to the data point P from each dimension of the target data set to obtain a plurality of first data points;
use the plurality of first data points as neighbors of the data point P;
determine whether a number of the neighbors of the data point P satisfies the denominator d of the noise ratio;
when the number of the neighbors of the data point P satisfies the denominator d of the noise ratio, determine the plurality of first data points as being the neighbor data set.

10. The electronic device according to claim 9, wherein the processor searches for neighbors of the data point P according to the created search index to obtain a neighbor data set further comprises:
when the number of the neighbors of the data point P does not satisfy the denominator d of the noise ratio, continue to search for a plurality of second data points with a second greatest similarity to the data point P from other dimensions of the target data set as the neighbors, until the number of the neighbors of the data point P satisfies the denominator d of the noise ratio.

11. The electronic device according to claim 9, wherein the denominator d of the noise ratio being set to twice the dimension of the data set or being set to $2^{\lceil log_2^{dim} \rceil+1}$, dim represents the dimension of the data set.

12. The electronic device according to claim 9, wherein the processor takes the data point P as a center, search for a first data point with a greatest similarity to the data point P from each dimension of the target data set comprises:
   from a first dimension of the target data set, search for data points corresponding to data with a greatest similarity to first data of the first dimension of the data point P as the first data points, comprising: searching for data points corresponding to data with a greatest similarity to the first data both in a positive direction and in a negative direction of the first data;
   from a second dimension of the target data set, search for data points corresponding to data with a greatest similarity to second data of the second dimension of the data point P as the first data points, comprising: searching for data points corresponding to data with a greatest similarity to the second data both in a positive direction and in a negative direction of the second data;
   repeatedly, from the first dimension of the target data set, search for the data points corresponding to the data with the greatest similarity to the first data of the first dimension of the data point P, as the first data points, and continue searching for, from the second dimension of the target data set, the data points corresponding to the data with the greatest similarity to the second data of the second dimension of the data point P, as the first data points, when all the dimensions of the target data set have been searched for, a plurality of first data points with the greatest similarity to the data point P are obtained.

13. A non-transitory storage medium having at least one computer-readable instructions stored thereon, when the at least one computer-readable instructions are executed by a processor to implement the following method:
   obtaining a target data set by performing dimensionality reduction processing on an initial data set, and obtaining dimensions of the target data set;
   creating a search index based on the target data set;
   setting a denominator d of a noise ratio based on dimensions of the target data set;
   selecting an unlabeled data point P from the target data set, and searching for neighbors of the data point P according to the created search index to obtain a neighbor data set;
   calculating a number of data in the neighbor data set of a type which is different from type of the data point P, and setting the calculated number to be a numerator c of the noise ratio;
   calculating the noise ratio A=c/d based on the denominator d of the noise ratio and the numerator c of the noise ratio;
   determining whether the calculated noise ratio is less than or equal to a preset noise ratio;
   when the calculated noise ratio is greater than the preset noise ratio, labeling the data point P as noise data;
   determining whether all data points in the target data set have been labeled; and
   when all data points in the target data set are labeled, deleting all the data points labelled as the noise data of the target data set.

14. The non-transitory storage medium according to claim 13, the method further comprising:
   when the calculated noise ratio is less than or equal to the preset noise ratio, labeling the data point P as reserved data.

15. The non-transitory storage medium according to claim 13, wherein searching for neighbors of the data point P according to the created search index to obtain a neighbor data set comprises:
   taking the data point P as a center, searching for a first data point with a greatest similarity to the data point P from each dimension of the target data set to obtain a plurality of first data points;
   using the plurality of first data points as neighbors of the data point P;
   determining whether a number of the neighbors of the data point P satisfies the denominator d of the noise ratio;
   when the number of the neighbors of the data point P satisfies the denominator d of the noise ratio, determining the plurality of first data points as being the neighbor data set.

16. The non-transitory storage medium according to claim 15, wherein searching for neighbors of the data point P according to the created search index to obtain a neighbor data set further comprises:
   when the number of the neighbors of the data point P does not satisfy the denominator d of the noise ratio, continuing to search for a plurality of second data points with a second greatest similarity to the data point P from other dimensions of the target data set as the neighbors, until the number of the neighbors of the data point P satisfies the denominator d of the noise ratio.

17. The non-transitory storage medium according to claim 15, wherein taking the data point P as a center, searching for a first data point with a greatest similarity to the data point P from each dimension of the target data set comprises:
   from a first dimension of the target data set, searching for data points corresponding to data with a greatest similarity to first data of the first dimension of the data point P as the first data points, comprising: searching for data points corresponding to data with a greatest similarity to the first data both in a positive direction and in a negative direction of the first data;
   from a second dimension of the target data set, searching for data points corresponding to data with a greatest similarity to second data of the second dimension of the data point P as the first data points, comprising: searching for data points corresponding to data with a greatest similarity to the second data both in a positive direction and in a negative direction of the second data;
   repeatedly, from the first dimension of the target data set, searching for the data points corresponding to the data with the greatest similarity to the first data of the first dimension of the data point P, as the first data points, and continuing searching for, from the second dimension of the target data set, the data points corresponding to the data with the greatest similarity to the second data of the second dimension of the data point P, as the first data points, when all the dimensions of the target data set have been searched for, a plurality of first data points with the greatest similarity to the data point P are obtained.

* * * * *